Figure 3:
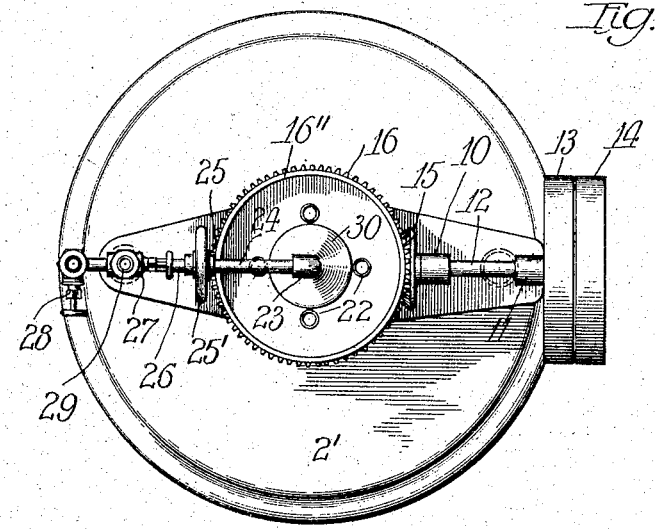

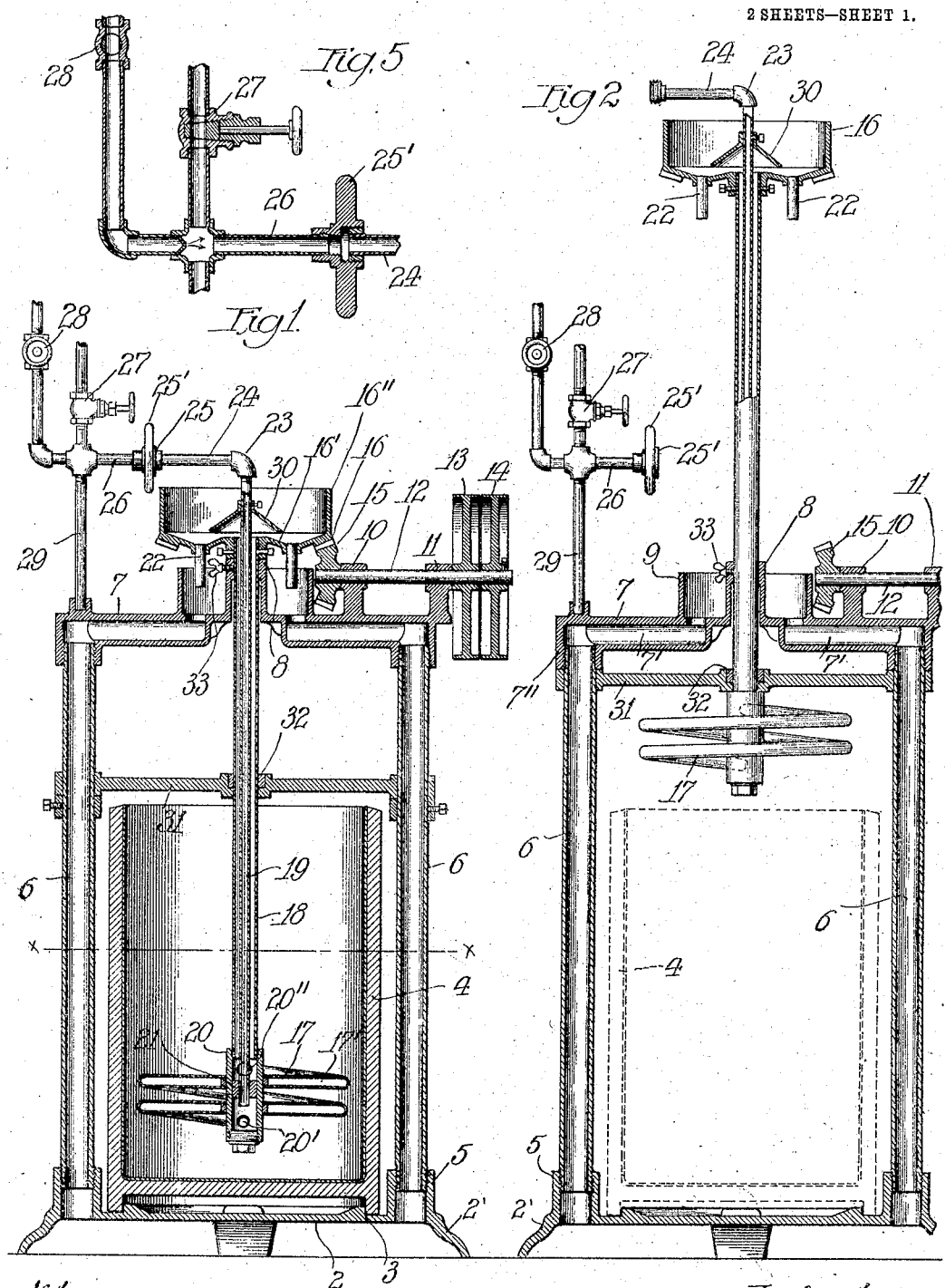

No. 781,382. PATENTED JAN. 31, 1905.
T. L. VALERIUS.
STARTER MAKING MACHINE.
APPLICATION FILED AUG. 17, 1903.

2 SHEETS—SHEET 2.

Witnesses:
Edward R. Barrett
George H. Kelly

Inventor
Theodore L. Valerius.
By C. H. Hawley
Atty.

No. 781,382. Patented January 31, 1905.

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

STARTER-MAKING MACHINE.

SPECIFICATION forming part of Letters Patent No. 781,382, dated January 31, 1905.

Application filed August 17, 1903. Serial No. 169,789.

*To all whom it may concern:*

Be it known that I, THEODORE L. VALERIUS, a citizen of the United States, residing at Fort Atkinson, in the county of Jefferson and State of Wisconsin, have invented a certain new, useful, and Improved Starter-Making Machine, of which the following is a specification.

This invention relates to machines or apparatus for facilitating the manufacture of ferments, and particularly the lactic-acid ferment or starter liquid used in ripening cream from which butter is made. This ferment or starter, having milk for its base or body, is used in large quantities. The quality of the butter which is manufactured from cream that has been ripened by the aid of a starter is largely dependent upon the quality of the starter. Hence the starter is an important element in the manufacture of butter. It is made either by the natural fermentation of skimmed milk or by the fermentation of skimmed milk with the addition of buttermilk or with a commercial lactic-acid ferment. The commercial ferment, which comprises a culture-body of minimum size thoroughly inoculated with the bacteria which will induce lactic fermentation, is preferred by most butter-makers, who use the same with skimmed milk, which is pasteurized before the ferment is mixed with it. It has been customary to place in a receptacle called a "starter-can" a quantity of skimmed milk either in its natural state or containing a small quantity of previously-manufactured starter or a quantity of the commercial ferment thoroughly admixed with the skimmed milk. The mixture is then covered and allowed to stand at a temperature of about 90° for from twelve to twenty-four hours, according to the character of the mixture. When held at the temperature noted, the whole body of milk will become thoroughly inoculated and fermented by the growth or development of the lactic-acid and like bacteria therein, and when it has reached the proper degree of acidity it is immediately mixed with a large body of fresh cream. If the cream is held in a suitable vat and at any temperature above that of refrigeration, the starter will promote the rapid fermentation of the cream, causing it to become ripe or ready for churning within a period dependent for its length upon the temperature at which the cream is held while ripening. Cream may be ripened by natural fermentation and without the addition of a starter; but this process is too slow for commercial uses, and the starter has been considered essential to butter-making for many years, though the concentrated commercial starter has been in use but a comparatively short time. In years past the ripening of the cream after inoculation with the starter has been a slow process, occupying the greater part of twenty-four hours, and churning was done but once a day. It was therefore convenient to devote as long a period to the development of the starter; but of recent years the processes of ripening cream and the apparatus employed for that purpose have been so improved that it is now possible to ripen several batches of cream in the same day, and in many creameries the work is carried on so rapidly that churnings occur every few hours. It thus appears that the slow and uncertain development and preparation of the starter even with the aid of prepared or commercial ferments is beginning to be recognized as an annoying feature and a hindrance in the conduct of a large dairy or creamery. Neither the process nor the apparatus for making the starter has been improved to an extent commensurate with the improvements in the other branches of the art, and creamery-men are to-day forced to spend their time and efforts in the constant attempt to harmonize the slow starter-making processes with the more rapid processes wherein the starter is used when finished. The result is that much imperfect starter is used, and in every large creamery there is much uncertainty as to the uniformity and quality of the different batches of starter that are used with successive batches of cream. The whole process is thus made to lack that uniformity which is essential to the production of uniform high-grade butter, and the butter-maker is placed in doubt as to the proper duration of the ripening process.

The object of my invention is to provide means for manufacturing or preparing ferments, particularly starter, for creameries. My object is to facilitate the preparation of the starter and place its development within the immediate control of an operator and make it possible to manufacture a quantity of starter within so short a time that the operator can afford to stand over and govern the operation of the machine until the liquid is sufficiently fermented for use and then effectively check the fermentation and keep the starter in the proper condition if it is not to be used at once.

The particular object of this invention is to provide a machine of light, simple, and cheap construction adapted to receive a can of milk and to heat or cool the contents of the can and also agitate the same as may be necessary to promote the rapid fermentation of said contents and then check its temperature when fermentation is complete.

My invention consists generally in a stirring, heating, and cooling device adapted to be placed in a starter-can, in combination with means for circulating, heating, and cooling fluids in said device for the purpose of controlling the temperature of the contents of the starter-can.

My invention also consists in a complete machine whereof the foregoing elements comprise the essential parts, all as hereinafter described, and pointed out in the claims.

The invention will be more readily understood by reference to the accompanying drawings, forming a part of this specification, and in which—

Figure 4:
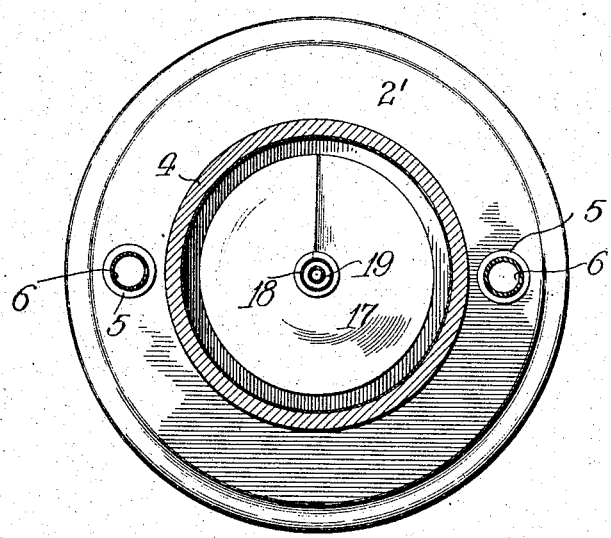

Figure 1 is a vertical sectional view illustrating a machine that embodies my invention. Fig. 2 is a similar view showing the heating and cooling device as it appears when raised to permit the removal or the placing of a starter-can upon the machine. Fig. 3 is a plan view of the machine. Fig. 4 is a plan section substantially on the line $x$ $x$ of Fig. 1, and Fig. 5 is a detail view of the steam and water connections of the machine.

As shown in the drawings, the principal elements of the machine in its preferred form are a base adapted to receive the starter can or receptacle, a supporting-column, a revoluble tempering device which hangs from said column, means for rotating the tempering device and means for supplying hot and cold fluids, usually steam and cold water, to the tempering device while the same is in rotation. As the can, with the half-barrel of liquid that it usually contains, is of considerable weight, I prefer to lift the lighter tempering device instead of moving the can or the column when it is desired to remove the tempering device from the starter-can, and my machine is so designed. My invention, however, obviously admits of any convenient relation of the parts and will be operative in any form in which tempering means are provided for immersion in the body of the liquid to be treated. It is possible also to use the starter-can as a permanent or stationary part of my machine if it is so arranged that it may be easily filled and emptied; but I have rejected this plan, because it is more convenient to employ the same cans for holding the batches of starter after it has been made therein. By means of the tempering device the temperature of the starter is reduced to a low point before each can is taken from the machine. The cans are then covered and placed in a refrigerator until needed. The time consumed in the complete development or preparation of a can of starter with the aid of my machine seldom exceeds thirty minutes, and it is therefore possible for one operator to make up a large number of batches of starter within a few hours and during the hours when he is not actively engaged in other branches of the creamery-work. Furthermore, as the fermentation goes on only under the observation of the operator the uniformity of the several batches is assured.

Referring again to the drawings for the details of my machine, it will be seen that the base 2 may be a circular casting provided with legs 2' and preferably having an annular groove 3 on its top to receive the bottom edge of the jacketed starter-can 4. On opposite sides of the can-groove 3 the base is provided with upwardly-extending bosses 5, in which are arranged the lower ends of pipes 6, which constitute the uprights of the column before referred to. These sides or pipes 6 support the cross-bar 7, which is a casting, generally of the form shown in Figs. 1 and 3. At the middle of the cross-bar is a vertical bearing 8, surrounded by a drain-pocket 9, the cylindrical walls and the bottom of which are preferably integral parts of the casting. The arms or opposite ends 7' 7' of the cross-bar are hollow and open into the bottom of the drain-pocket 9. The outer ends of the arms have vertical bosses 7'', that fit upon the pipes 6, and the hollow arms communicate with said pipe, so that water which enters the pocket 9 will flow down through the hollow arms and the pipes 6 and drain out upon the floor, avoiding the starter-can. In addition to the above the cross-bar is preferably provided with integral posts or blocks, containing the bearings 10 and 11 for the driving-shaft 12 of the machine. On its outer end this shaft is provided with a fixed and a loose pulley 13 14 to receive a narrow driving-belt. The inner end of the shaft carries a bevel-gear 15, that engages the larger bevel-gear 16 of the tempering device. Said tempering device comprises the hollow spiral 17 in connection with the hollow shaft 18 and the steam and water pipe 19 within it. The shaft 18 is held in the bearing 8, and said gear 16 is attached to its upper end for rotating the shaft and the spiral. The tempering device 17 is preferably separable from the shaft 18, and therefore has its own short shaft or hub 20, upon which the hollow spiral is secured. The spiral is made up of opposed thin sheet-metal parts and contains the spiral duct 17', which at its lower end communicates with the sleeve 20 by an opening 20' and at its upper end by an opening 20". The sleeve 20, fastened on the lower end of the shaft 18, contains a partition-block 21, between the holes 20' and 20". The small central pipe 19 passes through this block 21, and when steam or water, or both, are admitted through the pipe 19 the same will flow through the hole 20' into the spiral and thence upward to the discharge 20" of the spiral, from which it will be discharged upward through the shaft 18, around the pipe 19. The gear 16 on the upper end of the shaft 18 is provided with a solid web 16' and a cylindrical wall 16", forming a receiving pan or head to receive the water that ascends from the shaft 18. The bottom or web 16 of the pan and gear is provided with one or more short drain-pipes 22, which lead the water into the underlying pocket 9, from which the water drains, as before explained. In this manner I provide for the quiet draining of the machine while the tempering device is in rotation. The pipe 19 has its lower end journaled in the partition-block 21 of the tempering device and does not rotate. It has an elbow 23 on its upper end, from which a short pipe 24 extends to the union-coupling 25 on the steam and water pipe 26. 27 and 28 are the valved steam and water connections to said pipe 26.

29 is a post provided on the hollow-armed cross-bar to support the parts 28, 27, 26, and 19, with the intermediate parts.

The union 25 is preferably provided with a large hand-wheel 25', by which it may be quickly opened when it is desired to lift the tempering device.

30 represents a small hood that is attached to the pipe 19 above the open end of the shaft 18 to prevent the blowing out of the water when steam is suddenly turned into the pipe 19.

The normal position of the parts is as shown in Fig. 1, the tempering device being supported by the engagement of the hub-gear 16 with the upper end of the bearing 8. In order to give stability to the device when in this position, I preferably employ a cross or steadying bar 31, having a bearing 32 for the shaft 18. This bar is slidable on the column-pipes 6 and drops onto the top of the starter-can when the tempering-spiral is lowered. When the tempering device is raised, as shown in Fig. 2, the bar 31 lifts with it. For convenience I provide a set-screw or like device 33, preferably on the bearing 8, for holding the shaft and the tempering device in the elevated position while the starter-cans are being changed.

The use and operation of my machine in a creamery are as follows: The union 25 is first opened and the tempering device is lifted, as shown in Fig. 2, the steam and water pipe being closed. A starter-can is then placed on the base of the machine and is filled with the milk to be fermented. The tempering device is now lowered into the can. The operator makes sure that the gear 16 is in proper mesh with the pinion 15 and also connects the pipe-coupling or union 25. The water-pipe is then opened and the tempering device filled through the pipe 19, after which the steam-valve is opened and the water-valve closed or left only partially open. The steam driving down through the pipe 19 is condensed in the spiral, the surfaces of which are exposed to the cooler starter liquid. Thus while the steam heats the spiral to a high temperature the temperature is that of hot water, and the spiral is never hot enough to injure the liquid. The water that is expelled from the spiral by the ingoing steam and water is forced upward through the shaft 18 and exhausted into the pan or head at the upper end of the pipe. From the head the water drains into the pocket 9 and the column sides 6. The mere presence of the heated device in the body of milk is sufficient to raise the temperature of the milk and promote its rapid fermentation; but I prefer in all cases to rotate the tempering device either by a hand-crank (not shown) or through the medium of the belt-pulley. The rotation of the tempering-spiral in either direction agitates the liquid and causes the circulation thereof in the can, causing the liquid to take on a uniform temperature throughout. The agitation of the liquid insures uniform fermentation, and the rapidity with which fermentation progresses is directly proportional to the temperature that is maintained in the tempering device. This temperature may be as great as 150° Fahrenheit, and the fermentation of the milk may be completed within from twenty to thirty minutes. It is obvious that the rotation of the tempering device and the temperature thereof are directly within control of the operator, and when according to his judgment or test the liquid has reached the desired state he will immediately close the steam-valve and open the water-valve, meantime continuing the rotation of the spiral. The water is chilled, being cold well-water, ice-water, or brine, and being admitted to the tempering-spiral quickly lowers its temperature and through the medium thereof the temperature of the liquid in the can. In this manner the temperature of the canful of liquid may be reduced to approximately 40° Fahrenheit within a few minutes. This temperature is sufficiently low to effectually check further fermentation, and the can of starter is then ready to be used or stored. The tempering device is now lifted out of the can and the can is set to one side to make place for the next can. The cold cans of starter may be stored in a refrigerator and kept in perfect condition for several days ready for use at any time.

My machine has so simplified the making of starter that many creamery-men prefer to make up the needed batch of starter while the cream is being separated from the fresh milk preparatory to the ripening of the cream. This may be done without interrupting the regular work. It will be seen, therefore, that the preparation of the starter instead of being an element of delay and annoyance in creamery-work now becomes the most simple step in the manufacture of butter.

My invention has various uses, and numerous modifications of the same will readily suggest themselves to one skilled in the art. I therefore do not confine my invention to the specific constructions herein shown and described.

Having thus described my invention, I claim as new and desire to secure by Letters Patent—

1. In a starter-making machine, the starter-receptacle, in combination, with a rotary tempering device, a suitable support and guide for said device, said device being shiftable on said support for emersion and immersion in said receptacle and means for circulating heating and cooling fluids in said tempering device, substantially as described.

2. In a starter-making machine, the starter-receptacle, in combination, with a revoluble tempering device suitably supported, said receptacle and device being relatively movable, vertically, means for rotating said device and means for heating and cooling said device while in rotation, substantially as and for the purpose specified.

3. In a machine of the class described, a suitable base for the can or receptacle, in combination, with a tempering device supported on said base and movable toward and from the same, means for rotating and means for heating and cooling said tempering device, substantially as described.

4. In a machine of the class described, a suitable base for the can or receptacle, in combination, with a rotary tempering device, comprising a hollow propeller-like member of large external area, said device being movable toward and from said base and means for circulating tempering fluids therein, substantially as described.

5. In a machine of the class described, a suitable base for the can or receptacle, in combination, with a tempering device, containing a fluid chamber or duct, the supporting-shaft, through which fluid is supplied thereto, a support or column, wherein said shaft is movably held, and shaft-rotating means on said column, substantially as described.

6. In a machine of the class described, a base for the can or receptacle, in combination, with a suitable frame or column, a propeller-like tempering device vertically movable thereon and means for rotating said tempering device, substantially as described.

7. In a machine of the class described, the combination, of a suitable can or receptacle, with a rotary propeller-like tempering device therein, for tempering and agitating the contents of the receptacle, and means for heating and cooling said device, substantially as described.

8. In a machine of the class described, a suitable frame, in combination, with a rotary and longitudinally-movable tempering device, journaled and guided in said frame, means for rotating said device, and means for circulating heating and cooling fluids therein, while it is in rotation, substantially as described.

9. In a machine of the class described, a suitable frame, in combination with a vertical shaft slidably journaled therein, means for rotating said shaft, a tempering and agitating device on and movable with said shaft and a source of tempering fluid communicating with said device through said shaft, substantially as described.

10. In a machine of the class described, a suitable frame, in combination, with the spiral tempering device depending from said frame, said device being of large external area and containing a fluid-duct, means for rotating said device, and fluid connections for circulating heating and cooling fluids through said duct while said device is in rotation, substantially as described.

11. In a machine of the class described, a suitable frame, in combination with a vertical hollow shaft, having suitable bearings in said frame, means for rotating said shaft, a distinct pipe or duct within said shaft, a tempering device on the lower end of said shaft and containing a circulating-duct that is connected with said shaft and pipe, a fluid-supply connection and a drain connection arranged at the upper end of said shaft, substantially as described.

12. In a machine of the class described, the frame or column, in combination with a vertical shaft, longitudinally movable in said frame, means for rotating said shaft, the exhaust-head provided on the upper end of said shaft, the fluid-supply pipe entering said shaft, and the tempering device on the lower end of said shaft, wherewith said pipe communicates and which exhausts into said head, substantially as described.

13. In a machine of the class described, the frame, in combination with the hollow shaft journaled therein, the exhaust-head provided on the upper end of said shaft, the drain-pocket provided in the frame, beneath said head, the tempering device, on the lower end of said shaft, and means for supplying heating and cooling fluids thereto, the fluid being exhausted through said hollow shaft, head and pocket, substantially as described.

14. In a machine of the class described, a suitable frame, in combination, with a vertical bearing therein, the hollow shaft, in said bearing, the tempering device provided on the lower end of said shaft, and supplied with, and emptied of, fluid through said shaft, the exhaust-head on the upper end of said shaft, and driving means engaged with said head, for operating said shaft and tempering device, substantially as described.

15. In a machine of the class described, a suitable base for holding the can or receptacle, in combination, with a column, erected on said base, and having a vertical bearing in its upper part, the hollow shaft vertically movable in said bearing, means on said column for rotating said shaft, the fluid-supply pipe arranged in said shaft, the tempering device on the lower end of said shaft, in communication with said pipe and shaft, and a suitable drain connection on the upper end of said shaft, substantially as described.

16. In a machine of the class described, a suitable frame to receive the ferment can or receptacle, in combination with the hollow vertical shaft in said frame, to hang within said receptacle, means for rotating said shaft, a hollow spiral tempering device, on the lower end of said shaft, the means in said shaft for circulating heating and cooling fluids to said tempering device, and fluid-supplying means on said frame, substantially as described.

17. The tempering device for ferment-making machines, comprising a hollow shaft, in combination with a separate fluid-pipe therein, the hollow spiral on the end of said shaft, one end of the spiral duct therein communicating with said pipe and the other with said shaft, and a suitable exhaust or drain connection on the opposite end of said shaft, substantially as described.

18. In a machine of the class described, the base, in combination with the hollow column erected thereon, the cross-bar on said column, the bearing on said bar, the drain-pocket surrounding said bearing and communicating with the interior of said column, the tempering device, the shaft thereof, held in said bearing and having an exhaust-head adapted to discharge into said pocket, and means for rotating said shaft, substantially as described.

19. In a machine of the class described, a suitable frame, provided with a vertical bearing, in combination, with a drain-pocket surrounding said bearing, the fluid-conducting shaft held in said bearing, the exhaust-head provided on the upper end of said shaft and having openings in its bottom, above said pocket, the gear upon said head, a driving-pinion arranged on said frame and engaged with said gear, and the tempering device provided on the lower end of said shaft and suitably supplied with tempering fluids, substantially as described.

20. In a machine of the class described, the base, in combination, with the column-pipes erected thereon, the hollow cross-bar on the upper ends of said pipes and communicating therewith, the drain-pocket provided on said bar, the tempering device, the shaft thereof, borne by said bar, the exhaust-head provided on said shaft and delivering into said pocket, means for supplying heating and cooling fluids to said tempering device, and means for rotating said shaft with said device, substantially as described.

21. In a starter-making machine, the combination, of the starter can or receptacle, with the tempering and agitating device, comprising the hollow spiral, the hollow operating-shaft, said spiral having openings at the ends of its hub, the partition within the hubs, between said openings, the fluid-pipe in said hollow shaft and extending through said partition, and means for rotating said spiral, substantially as described.

22. In a machine of the class described, a suitable frame, in combination, with the vertical hollow shaft, arranged therein, the fluid-supply pipe provided in said shaft, the hollow tempering device on the lower end of said shaft, in communication with said shaft and pipe, means on the frame for rotating said shaft, the valved fluid connections supported on said frame, a suitable coupling between said connections and said pipe, permitting the lifting of said shaft and tempering device in said frame, as and for the purpose specified.

23. In a machine of the class described, the base, in connection with the column-pipes 6, and cross-bar supported by said pipes, and provided with a middle bearing, the drain-pocket surrounding said bearing, the driving-shaft and pinion arranged on said bar, the hollow shaft in said bearing, the combined gear and exhaust-head on the upper end of said shaft, above said pocket, the fluid-supply pipe in said shaft, the valved heating and cooling fluid connections, supported on said bar and coupled to said pipe, and the hollow spiral on the lower end of said shaft and having its ends connected with said shaft and pipe respectively, substantially as described.

24. In a starter-making machine, a can to contain the starter liquid, in combination with a frame in proximity thereto, a shaft occupying a vertical position in said frame, and adapted for vertical movement therein; means for rotating said shaft; a hollow tempering and agitating device upon the lower end of said shaft; a suitable source of tempering fluid and ducts for conveying the tempering fluid to and from said tempering and agitating device when the same is in rotation, substantially as described.

In testimony whereof I have hereunto set my hand, this 11th day of August, 1903, in the presence of two witnesses.

THEODORE L. VALERIUS.

Witnesses:
  C. G. HAWLEY,
  B. K. SEFTON.